United States Patent
Yamamoto et al.

(10) Patent No.: US 10,569,793 B2
(45) Date of Patent: Feb. 25, 2020

(54) TRAIN CONTROL DEVICE

(71) Applicant: KABUSHIKI KAISHA TOSHIBA, Minato-ku, Tokyo (JP)

(72) Inventors: Junko Yamamoto, Yokohama Kanagawa (JP); Satoshi Iba, Hachioji Tokyo (JP); Yohei Hattori, Koto Tokyo (JP); Yasuyuki Miyajima, Kunitachi Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 409 days.

(21) Appl. No.: 15/329,524

(22) PCT Filed: Aug. 25, 2014

(86) PCT No.: PCT/JP2014/072128
§ 371 (c)(1),
(2) Date: Jan. 26, 2017

(87) PCT Pub. No.: WO2016/017041
PCT Pub. Date: Feb. 4, 2016

(65) Prior Publication Data
US 2017/0210405 A1    Jul. 27, 2017

(30) Foreign Application Priority Data

Jul. 29, 2014    (JP) ................................. 2014-153993

(51) Int. Cl.
*B61L 27/04*    (2006.01)
*B61L 23/16*    (2006.01)
(Continued)

(52) U.S. Cl.
CPC ............... *B61L 27/04* (2013.01); *B60L 15/40* (2013.01); *B61L 23/16* (2013.01); *B61L 25/021* (2013.01);
(Continued)

(58) Field of Classification Search
CPC .. B60L 2240/12; B61L 3/008; B61L 15/0072; B61L 23/16; B61L 25/021;
(Continued)

(56) References Cited

U.S. PATENT DOCUMENTS 6,095,618 A * 8/2000 Heneka .................. B60L 15/32
246/167 R
7,092,801 B2 * 8/2006 Kane ....................... B61L 3/008
246/122 R
(Continued)

FOREIGN PATENT DOCUMENTS

EP          2554427 A1    2/2013
JP       2004266986 A    9/2004
(Continued)

OTHER PUBLICATIONS

International Search Report (and English translation thereof) dated Nov. 25, 2014 issued in counterpart International Application No. PCT/JP2014/072128.
(Continued)

*Primary Examiner* — Zachary L Kuhfuss
(74) *Attorney, Agent, or Firm* — Holtz, Holtz & Volek PC

(57) ABSTRACT

A train control device, according to one embodiment, includes a storage unit, an acquiring unit, and a control unit. The storage unit is configured to store therein information of a plurality of limit speeds corresponding to a plurality of respective blocks and being determined based on a block on which a preceding train traveling at least one ahead is located. The acquiring unit is configured to acquire schedule information of the preceding train indicating a time at which the preceding train exits each of the blocks. The control unit is configured to determine a limit speed in each of the blocks associated with a travel of a train, based on the acquired schedule information and the information of the limit speeds; and to create a travel plan of the train using the determined limit speed.

3 Claims, 11 Drawing Sheets

(51) Int. Cl.
  *B60L 15/40* (2006.01)
  *B61L 25/02* (2006.01)
  *B61L 27/00* (2006.01)
(52) U.S. Cl.
  CPC ......... *B61L 25/025* (2013.01); *B61L 27/0005* (2013.01); *B61L 27/0011* (2013.01); *B61L 2201/00* (2013.01); *B61L 2205/04* (2013.01)
(58) Field of Classification Search
  CPC ............... B61L 25/025; B61L 27/0027; B61L 27/0038; B61L 27/04; B61L 2201/00
  See application file for complete search history.

(56) References Cited

U.S. PATENT DOCUMENTS

| | | | | |
|---|---|---|---|---|
| 7,715,956 | B2* | 5/2010 | Bryant | B60L 15/38 105/26.05 |
| 8,140,202 | B2* | 3/2012 | Dibble | G05D 13/62 104/53 |
| 8,374,739 | B2 | 2/2013 | Yamamoto et al. | |
| 8,989,917 | B2* | 3/2015 | Kumar | B61L 3/006 701/19 |
| 9,889,870 | B2* | 2/2018 | Nameki | B61L 3/004 |
| 10,053,122 | B2* | 8/2018 | Hagiwara | B60L 15/40 |
| 2003/0120400 | A1* | 6/2003 | Ahmed Baig | B60L 15/32 701/19 |
| 2007/0219681 | A1* | 9/2007 | Kumar | B61L 3/006 701/19 |
| 2012/0245770 | A1* | 9/2012 | Yamamoto | B61L 27/0027 701/20 |
| 2013/0325224 | A1* | 12/2013 | Yamamoto | B61L 27/0016 701/20 |
| 2017/0210405 | A1* | 7/2017 | Yamamoto | B60L 15/40 |

FOREIGN PATENT DOCUMENTS

| | | |
|---|---|---|
| JP | 2005082054 A | 3/2005 |
| JP | 2011006009 A | 1/2011 |
| JP | 2011045168 A | 3/2011 |
| JP | 2011217564 A | 10/2011 |

OTHER PUBLICATIONS

Extended European Search Report (EESR) dated Apr. 5, 2018 issued in counterpart European Application No. 14898363.8.

\* cited by examiner

| BLOCK NUMBER | BLOCK BOUNDARY POSITION[m] | | SIGNAL EXPANSION NUMBER | | | | | | |
|---|---|---|---|---|---|---|---|---|---|
| | START END | FINISH END | 0 | 1 | 2 | 3 | 4 | 5 | 6 |
| 1 | 0 | 500 | 40 | 40 | 02 | 01 | 25 | 40 | 40 |
| 2 | 500 | 1000 | 55 | 55 | 55 | 02 | 01 | 25 | 40 |
| 3 | 1000 | 1500 | 70 | 40 | 55 | 70 | 02 | 01 | 25 |
| 4 | 1500 | 2000 | 70 | 25 | 40 | 55 | 70 | 02 | 01 |
| 5 | 2000 | 2500 | 55 | 01 | 25 | 40 | 55 | 55 | 02 |
| 6 | 2500 | 3000 | 40 | 02 | 01 | 25 | 40 | 40 | 40 |
| 7 | 3000 | 3500 | 55 | 55 | 02 | 01 | 25 | 40 | 55 |
| 8 | 3500 | 4000 | 70 | 55 | 70 | 02 | 01 | 25 | 40 |
| 9 | 4000 | 4500 | 70 | 40 | 55 | 70 | 02 | 01 | 25 |
| 10 | 4500 | 5000 | 55 | 25 | 40 | 55 | 55 | 02 | 01 |
| 11 | 5000 | 5500 | 40 | 01 | 25 | 40 | 40 | 40 | 02 |
| 12 | 5500 | 6000 | 55 | 02 | 01 | 25 | 40 | 55 | 55 |
| 13 | 6000 | 6500 | 70 | 70 | 02 | 01 | 25 | 40 | 55 |
| 14 | 6500 | 7000 | 70 | 55 | 70 | 02 | 01 | 25 | 40 |
| 15 | 7000 | 7500 | 55 | 40 | 55 | 55 | 02 | 01 | 25 |
| 16 | 7500 | 8000 | 40 | 25 | 40 | 40 | 40 | 02 | 01 |

TRAIN CONTROL DEVICE

CROSS-REFERENCE TO RELATED APPLICATIONS

This application is national stage application of International Application No. PCT/JP2014/072128, filed Aug. 25, 2014, which designates the United States, incorporated herein by reference, and which is based upon and claims the benefit of priority from Japanese Patent Application No. 2014-153993, filed Jul. 29, 2014, the entire contents of which are incorporated herein by reference.

FIELD

Embodiments described herein relate generally to a train control device.

BACKGROUND

Conventionally, when, for example, a preceding train is delayed, there is a case where the preceding train and a train in traveling come closer to each other relatively to the normal time when there is no delay, in order to minimize the delay of the train and to minimize the influence on a following train. In this case, when the preceding train and the train extremely come close to each other, the train is decelerated, and then, when the preceding train and the train become far away from each other, the train is accelerated so as to come close to the preceding train. Then, when the preceding train and the train extremely come close to each other again, the train is decelerated. Thus, in the conventional technique, there is a case where acceleration and deceleration of the train are repeated.

In the above-described technique, it is desirable that a train smoothly travel while the influence on a following train is minimized.

DETAILED DESCRIPTION

In general, according to one embodiment, a train control device includes a storage unit, an acquiring unit, and a control unit. The storage unit is configured to store therein information of a plurality of limit speeds corresponding to a plurality of respective blocks and being determined based on a block on which a preceding train traveling at least one ahead is located. The acquiring unit is configured to acquire schedule information of the preceding train indicating a time at which the preceding train exits each of the blocks. The control unit is configured: to determine a limit speed in each of the blocks associated with a travel of a train, based on the acquired schedule information and the information of the limit speeds; and to create a travel plan of the train using the determined limit speed.

Hereinafter, an embodiment will be described with reference to the accompanying drawings.

First, an example of the configuration of a train control system 1000 according to the embodiment will be described with reference to FIGS. 1 to 19.

Figure 1:
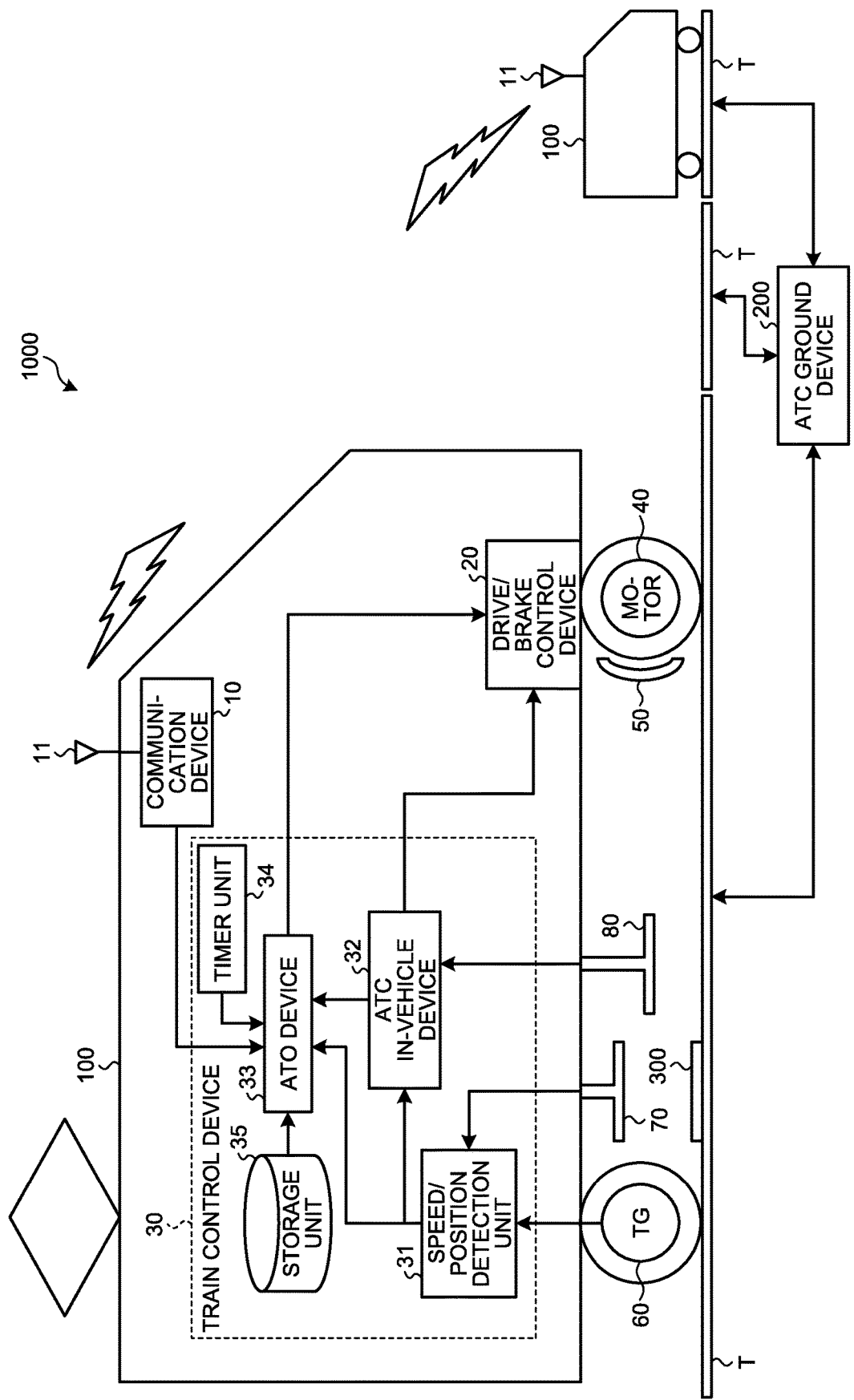
FIG. 1 is a diagram illustrating an example of the entire configuration of a train control device according to an embodiment.

As illustrated in FIG. 1, the train control system 1000 includes: a train 100 which travels in each block T on a track; and an automatic train control (ATC) ground device 200.

The train 100 includes a communication device 10, a drive/brake control device 20, and a train control device 30.

The communication device 10 is configured to communicate with another train 100 via an antenna 11. For example, the communication device 10 is configured to receive, from a preceding train, schedule information (see FIG. 2) indicating each schedule hour or time at which a preceding train traveling at least one ahead of the train 100 (hereinafter, referred to as a train) equipped with the communication device 10 is scheduled to exit each block T on the track.

Figures 2, 3:
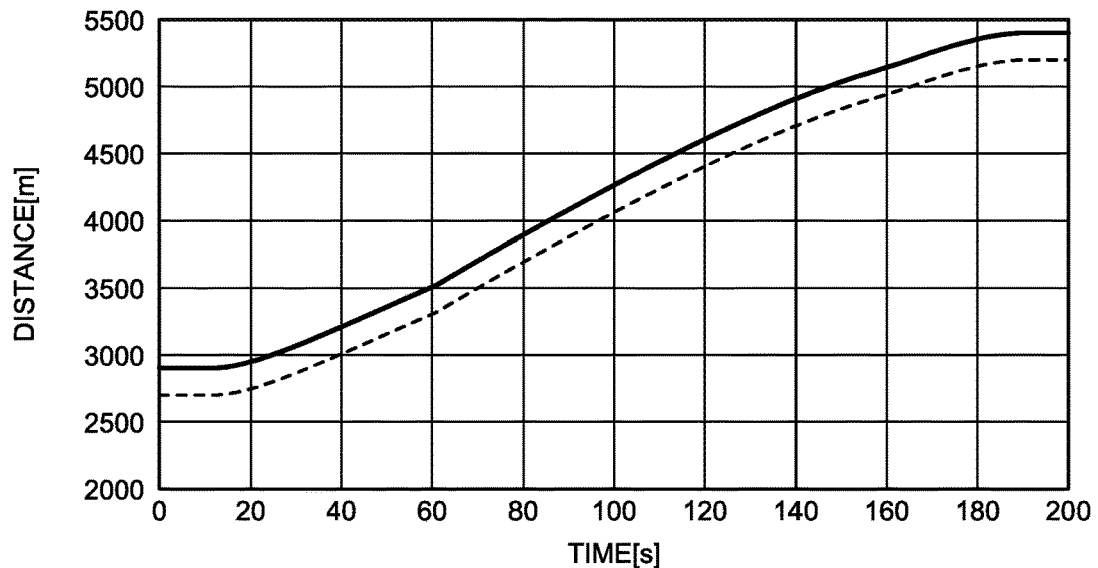
FIG. 2 is a diagram illustrating an example of schedule information which is received from a preceding train by the train control device according to the embodiment.
FIG. 3 is a diagram illustrating an example of signal expansion information which is stored in a storage unit of the train control device according to the embodiment.

In FIG. 2, the curve of the solid line indicates a time-based change of the lead position of the preceding train, and the curve of the dotted line indicates a time-based change of the rear end position of the preceding train. If it is assumed that the values such as 2500 m, 3000 m, 3500 m, 4000 m, 4500 m, 5000 m, and 5500 m of the vertical axis indicate the boundary positions of respective blocks T on the track, it is possible to understand that the rear end position of the preceding train passes the above-described boundary positions after about 40 s, about 70 s, about 95 s, about 125 s, and about 165 s. Therefore, according to FIG. 2, it is possible to know the timing of the schedule at which the preceding train exits each block T. The values of the vertical axis and the horizontal axis of FIG. 2 are merely an example and the embodiment is not limited to the values.

The drive/brake control device 20 is configured to control driving/braking of the train by controlling a motor 40 connected to an axle shaft and a brake device 50.

The train control device 30 includes a speed/position detection unit 31, an ATC in-vehicle device 32, an automatic train operation (ATO) device 33, a timer unit 34, and a storage unit 35. The ATO device 33 is an example of the "control unit".

The speed/position detection unit 31 is configured to detect the present position and speed of the train by acquiring information from a tachogenerator (TG) 60 mounted on the axle shaft or by acquiring information from a ground element 300 provided in each block T via an in-vehicle element 70. The method for detecting the position and speed of the train is not limited thereto. For example, the position and speed of the train may be detected by using a GPS (Global Positioning System) or the like.

The ATC in-vehicle device 32 is configured to output a brake command for preventing the train from colliding with the preceding train. More specifically, the ATC in-vehicle device 32 is configured such that, first, the ATC in-vehicle device 32 receives the information on the signal indication in the block T in which the train is located from the ATC ground device 200 via a receiver 80, and then the ATC in-vehicle device 32 compares the limit speed based on the received signal indication and the speed of the train detected by the speed/position detection unit 31. In addition, the ATC in-vehicle device 32 is configured to output a brake command to the drive/brake control device 20 when the speed of the train exceeds the limit speed.

The ATC ground device 200 is configured: to detect whether or not the train 100 is located in each block T through a track circuit (not illustrated) provided in each block T; and to determine the signal indication in each block T in accordance with the train-location state. In addition, the ATC ground device 200 is configured to send the information on the signal indication in each block T to the ATC in-vehicle device 32 via the track circuit.

The ATO device 33 is configured to calculate the limit speed in each block T at each schedule hour at which the preceding train is scheduled to exit the each block T on the basis of: the schedule information received by the communication device 10; the information indicating the position and speed of the train detected by the speed/position detection unit 31; various information stored in the storage unit 35; the signal indication information received by the ATC in-vehicle device 32; and the current hour clocked by the timer unit 34. Herein, there is a case where the limit speed in each block T is changed in accordance with which block T of the track the preceding train is located in. In other words, there is a case where the limit speed in each block T is changed in each schedule hour at which the preceding train is scheduled to exit each block T.

Here, an example of the various information stored in the storage unit 35 will be described. For example, the storage unit 35 stores therein route information, travel information, and train car information.

The route information includes: information on a target stop position which is the target when the train stops at each station; information on the gradient and curve (radius of curvature) of the route; signal expansion information in each block T; and information indicating the boundary position of each block T. In addition, the route information includes information indicating the alignment of respective blocks T, linear information indicating the correspondence relationship between each stop line number of each station and each block T, and the like.

The travel information includes: information on the station corresponding to the train operation type; a time when the train arrives at and departs from each station; and information indicating which line of each station the train arrives at. The train car information includes: the length of the train; and the characteristics of acceleration/deceleration corresponding to power running/brake commands.

Next, an example of the signal expansion information included in the route information will be described with reference to FIGS. 3 to 5. As illustrated in FIG. 3, the signal expansion information includes, for example, a block number, a block boundary position, and a signal expansion number.

The block number is the number given to each block T on the track. Hereinafter, for the convenience of the description, a block T of which the block number is n will be referred as a block Tn. The block boundary position indicates the positions of the start end and the finish end of each block T. The entirety of patterns of the limited speeds of a train in each block T, each of the patterns depending on the located position of the preceding train, is registered in the signal expansion number.

Figure 4:
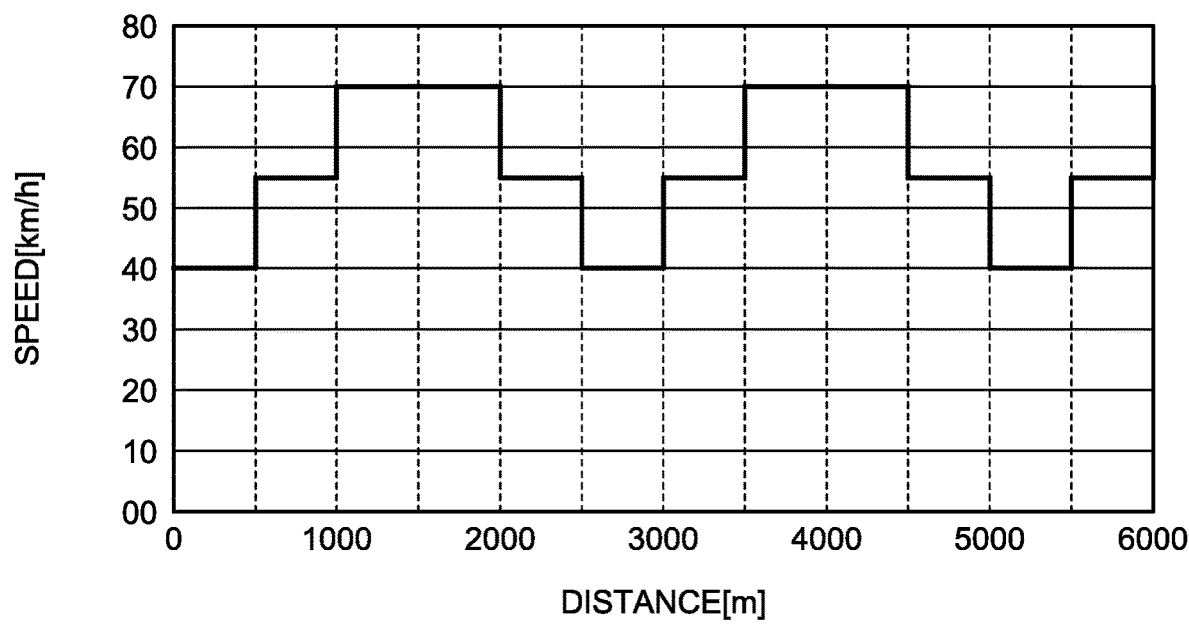
FIG. 4 is a diagram illustrating an example of the limit speed in each block which is on the basis of the signal expansion information according to the embodiment.

For example, FIG. 4 illustrates an example of the limit speeds of a train in blocks T1 to T12 (0 to 6000 m) when the preceding train is not located on any block T on the track. The graph illustrated in FIG. 4 corresponds to each value registered in the line of which the signal expansion number is [0] of the signal expansion information illustrated in FIG. 3.

The ATO device 33 of the embodiment is configured to calculate, when a time zone where the preceding train is not located in any block T on the track is identified, the limit speed (see FIG. 4) in each block T in the time zone, by referring to each value registered in the line of which the signal expansion number is [0] of the signal expansion information (see FIG. 3) based on the schedule information (see FIG. 2) received from the preceding train. The preceding train sends the schedule information, for example, for each constant period or when the train leaves the station or the schedule is changed.

Figure 5:
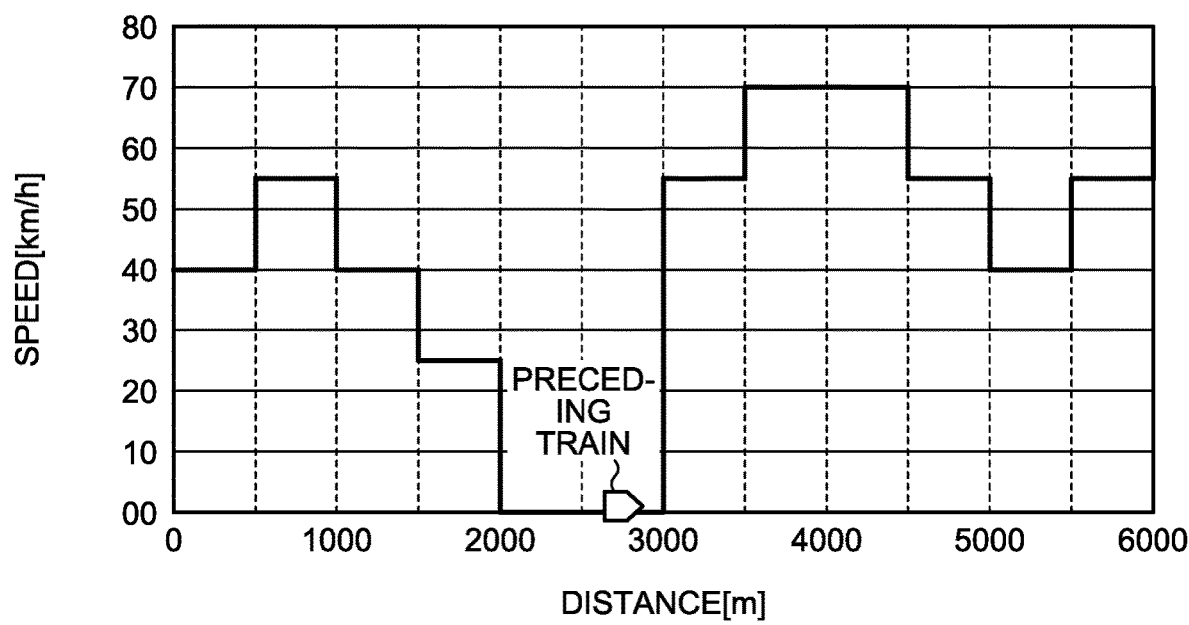
FIG. 5 is a diagram illustrating an example of the limit speed in each block which is on the basis of the signal expansion information according to the embodiment and differs from that of FIG. 4.

FIG. 5 illustrates an example of the limit speeds of the train in each block T when the preceding train is located in the block T6 (2500 m to 3000 m). The limit speeds in the blocks T1 to T6 (0 m to 3000 m) of the graph illustrated in FIG. 5 respectively correspond to the values of the block numbers 1 to 6 of values of the line of which the signal expansion number is [1] of the signal expansion information illustrated in FIG. 3. The parts on or after the block T7 (on or after 3000 m) of the graph illustrated in FIG. 5 is the same as the parts on or after the block T7 of the graph illustrated in FIG. 4.

In this case, although the values of [01] and [02] are respectively registered in the parts of the block numbers 5 and 6 in the line of the signal expansion number [1] in the signal expansion information illustrated in FIG. 3, the values of [01] and [02] both indicate that the limit speed is 0. More specifically, the value of [01] indicates that the limit speed is 0 because the preceding train is positioned in a block T located one ahead of the block T (the block T5 in FIG. 3) corresponding to the value of [01]. The value of [02] indicates that the limit speed is 0 because the preceding train is located in the block T (the block T6 in FIG. 3) corresponding to the value of [02].

When a time zone where the preceding train is located in the block T6 is identified, The ATO device 33 of the embodiment is configured to identify, based on the schedule information (see FIG. 2) received from the preceding train, the limit speed (see FIG. 5) in each block T in the time zone by referring to respective values of the block numbers 1 to 6 of the values in the line of the signal expansion number [1] in the signal expansion information (see FIG. 3).

Figure 6:
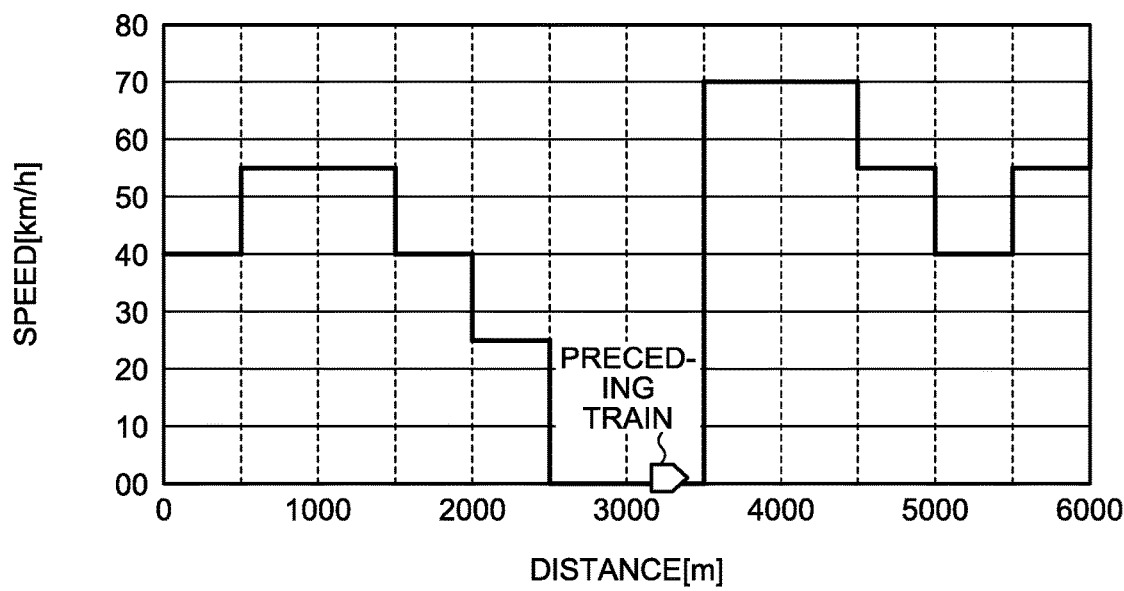
FIG. 6 is a diagram illustrating an example of the limit speed in each block which is on the basis of the signal expansion information according to the embodiment and differs from those of FIGS. 4 and 5.

FIG. 6 illustrates an example of the limit speeds of the train in each block T when the preceding train is located in the block T7 (3000 m to 3500 m). The limit speeds in the blocks T2 to T7 (500 m to 3500 m) of the graph illustrated in FIG. 6 respectively correspond to the values of the block numbers 2 to 7 of values in the line of the signal expansion number [2] in the signal expansion information illustrated in FIG. 3. The part on or before the traveling distance of 500 m (the block T1) in the graph illustrated in FIG. 6 is the same as each limit speed in the part of the block T1 in the graph illustrated in FIG. 4. Each limit speed of the part on or after the traveling distance of 3500 m (on or after the block T8) in the graph illustrated in FIG. 6 is the same as each limit speed in the part after the block T8 in the graph illustrated in FIG. 4.

When a time zone where the preceding train is located in the block T7 is identified, the ATO device 33 of the embodiment is configured to identify, based on the schedule information (see FIG. 2) received from the preceding train, the limit speed (see FIG. 6) in each block T in the time zone is identified by referring to respective values of the block numbers 2 to 7 of the values in the line of the signal expansion number [2] in the signal expansion information (see FIG. 3).

The value in each cell of the table of FIG. 3 and the values of the vertical and horizontal axes of FIGS. 4 to 6 are merely an example and the embodiment is not limited to those values.

When the limit speed is calculated in the above-described manner, the ATO device 33 of the embodiment is configured to create, based on the calculated limit speed, the travel plan in which the speed of the train is prevented from exceeding the limit speed at each timing when the train enters each block T until the train arrives at a next station and in which the train travels each block T as fast as possible until the train arrives at the next station. In addition, the ATO device 33 is configured to output a power running command and a brake command to the drive/brake control device 20 based on the travel plan created in the above-described manner.

Here, the detail of a method for creating the travel plan according to the embodiment will be described with reference to FIGS. 7 to 18. Hereinafter, an example where the train leaves a station located at the block T1 and stops at a station located at the block T8 will be described.

The ATO device 33 of the embodiment is configured to create the travel plan to the next station by repeating the following processes for each block T to the next station: a process of creating or modifying, if the limit speed of the train in the succeeding block Tn+1 is changed from a first speed to a second speed at the timing τ when the train enters a succeeding block Tn+1 from a block Tn, the travel plan such that the speed of the train in the travel plan becomes equal to or slower than the second speed at the timing τ; and a process of creating or modifying, if the limit speed in the succeeding block Tn+1 maintains the first speed and does not changed at the timing τ, the travel plan such that the speed of the train in the travel plan becomes equal to or slower than the first speed at the timing τ.

Figure 7:
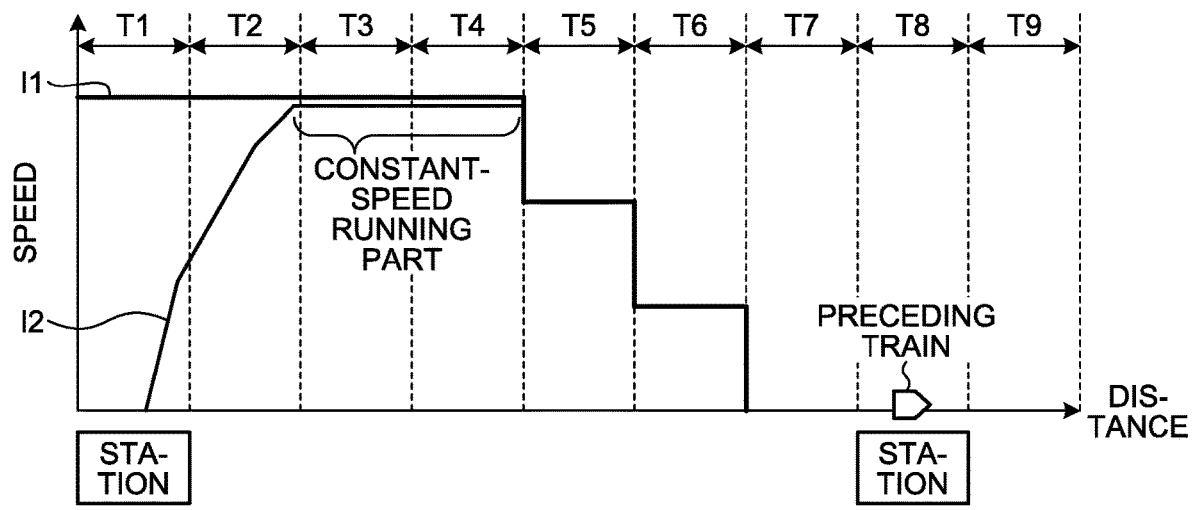
FIG. 7 is a diagram for explaining an example of the procedure for the train control device to create a travel plan, according to the embodiment.

For example, as illustrated in FIG. 7, if the limit speed at a timing τ1 when the train enters the block T5 is set as a polygonal line 11 because the preceding train is located in the block T8, the ATO device 33 firstly creates a fastest travel plan as illustrated in polygonal line 12, that is, the fastest travel plan for making the train travel each block on or before the block T4 at the speed equal to or slower than the limit speed and as fast as possible. If it is assumed that the limit speed in the block T5 does not change at the timing τ1, the speed of the train in the fastest travel plan at the timing τ1 becomes faster than the limit speed in the block T5 at the timing τ1. In this case, the ATO device 33 modifies the fastest travel plan on or before the block T4, as described below, such that the speed of the train at the timing τ1 becomes equal to or slower than the limit speed in the block T5 at the timing τ1.

Figure 8:
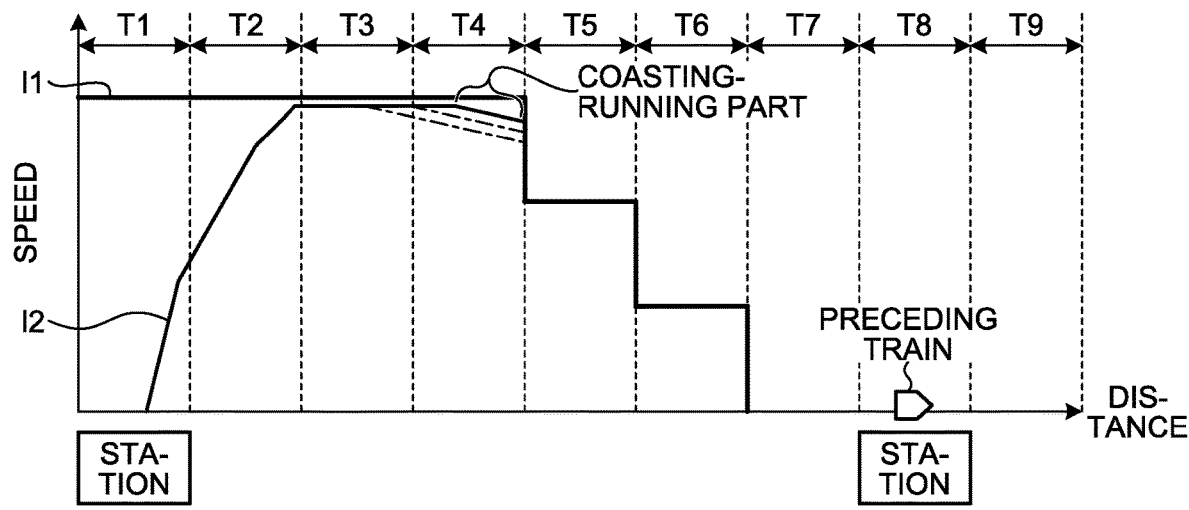
FIG. 8 is a diagram for explaining an example of the procedure for the train control device to create the travel plan, according to the embodiment.

First, the ATO device 33 replaces a constant-speed running part included in the fastest travel plan illustrated in FIG. 7 with a coasting-running part from a finish-end side part in order (see the dashed-dotted line of FIG. 8), as illustrated in FIG. 8. In addition, although not illustrated in the drawing, if the power running part is included in the fastest travel plan, the ATO device 33 also replaces the power running part with the coasting-running part from the finish-end side part in order. The power running part replaced in this case is a re-power running part indicating that the train which has been performed power running once performs power running again. The power running part replaced in this case does not include a power running part at the time of station departure. The reason for this is that, if the power running part at the time of station departure is replaced with a coasting-running part, the train slowly travels at the time of station departure and the distance between the train and the following train is likely to be shortened, and thus this influences the travel of the following train.

Figure 9:
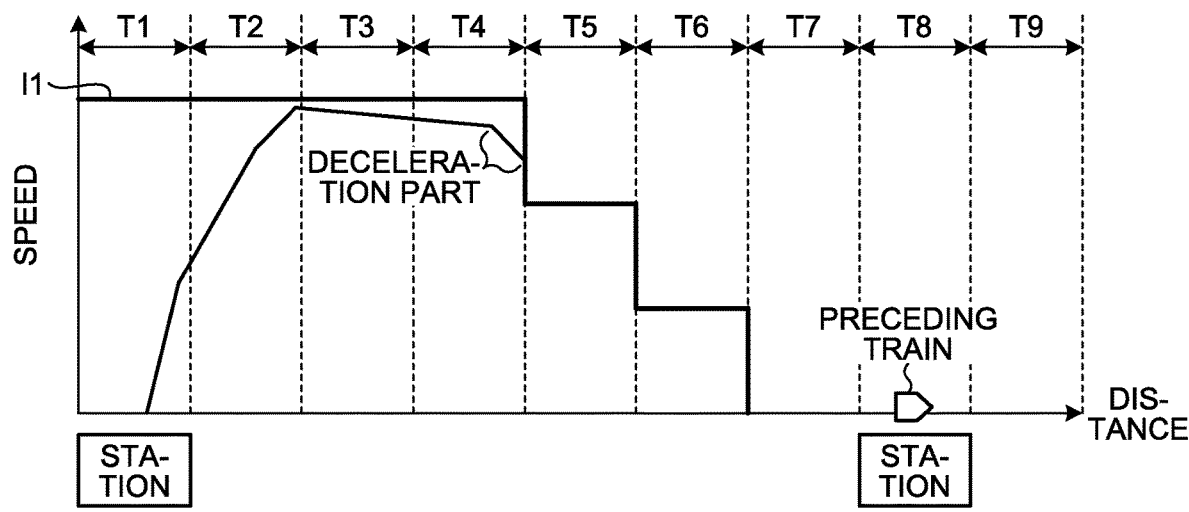
FIG. 9 is a diagram for explaining an example of the procedure for the train control device to create the travel plan, according to the embodiment.
Figure 10:
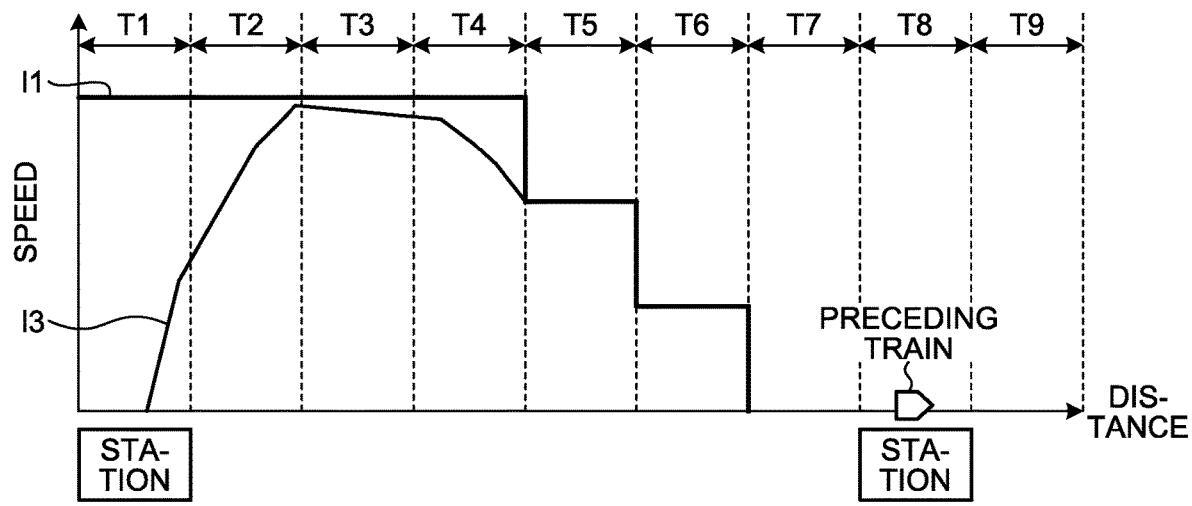
FIG. 10 is a diagram for explaining an example of the procedure for the train control device to create the travel plan, according to the embodiment.

When the speed of the train at the time of entering the block T6 is faster than the limited speed even if the entirety of the constant-speed running part is replaced with the coasting-running part in the above-described manner, the ATO device 33 replaces the coasting-running part with a deceleration part from the finish-end side in order, as illustrated in FIG. 9. In addition, if the travel plan illustrated in a polygonal line 13 of FIG. 10, that is, the travel plan in which the speed of the train at the time of entering the block T6 becomes equal to or slower than the limit speed can be created by replacing the coasting-running part with the deceleration part, the ATO device 33 adopts the created travel plan as a travel plan on or before the block T4.

Figure 11:
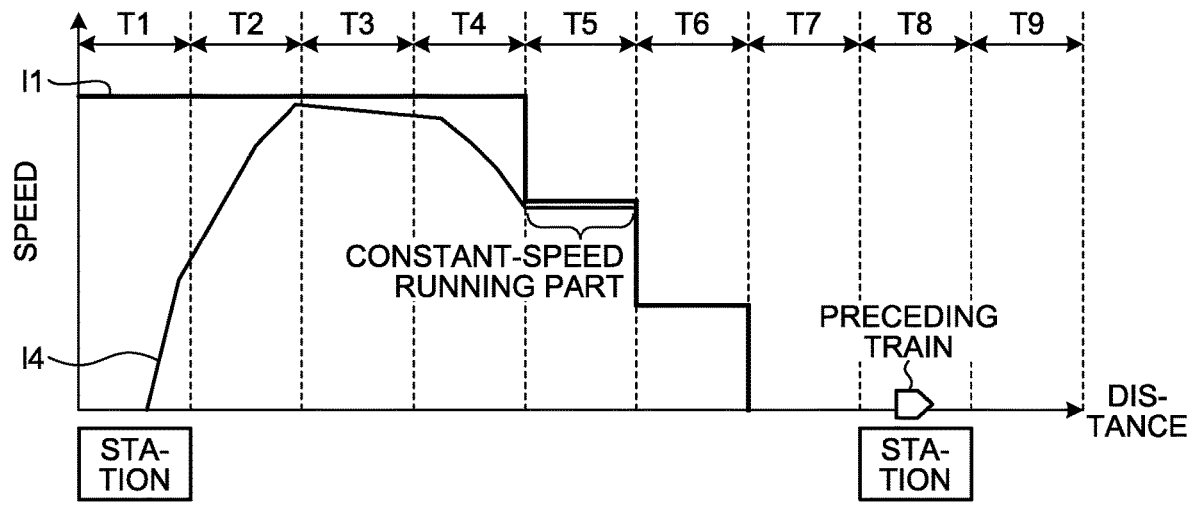
FIG. 11 is a diagram for explaining an example of the procedure for the train control device to create the travel plan, according to the embodiment.
Figure 12:
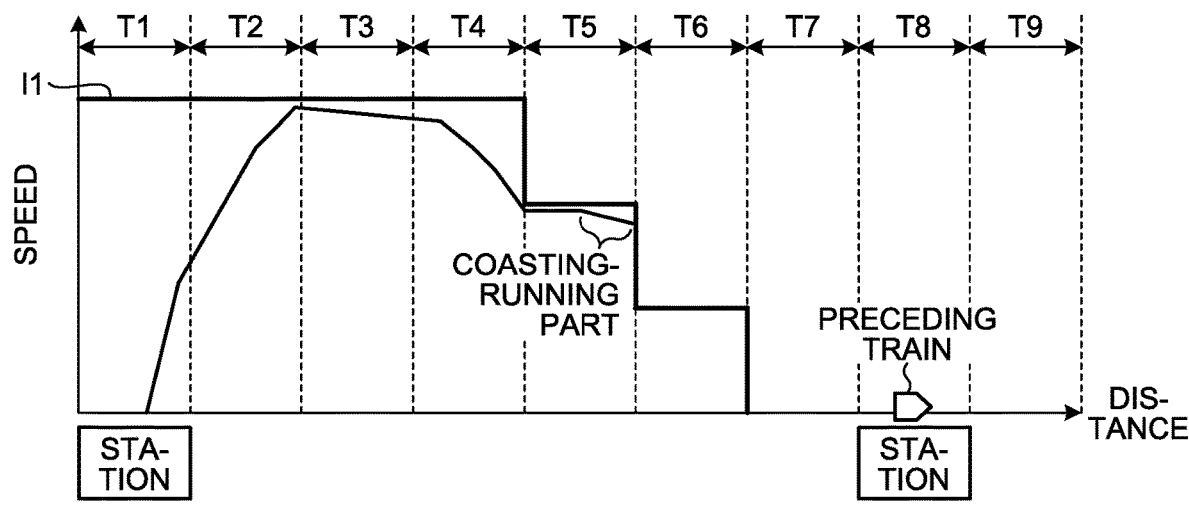
FIG. 12 is a diagram for explaining an example of the procedure for the train control device to create the travel plan, according to the embodiment.

As illustrated in FIG. 11, when the travel plan on or before the block T4 is created in the above-described manner, the ATO device 33 adds the fastest travel plan for traveling the succeeding block T5 at the speed equal to or slower than the limit speed and as fast as possible to the travel plan on or before the block T4 which has been created in advance, so that the travel plan (see polygonal line 14 including the constant-speed running part illustrated in FIG. 11) on or before the block T5 is created. Furthermore, if it is assumed that the limit speed in the block T6 does not change at a timing τ2 when the train enters the block T6 according to the travel plan illustrated in FIG. 11, the ATO device 33 replaces the constant-speed running part of the travel plan illustrated in FIG. 11 with the coasting-running part (see FIG. 12), and replaces the coasting-running part with the deceleration part (see FIG. 13), similarly to the case illustrated in FIGS. 7 to 9 described above.

Figure 13:
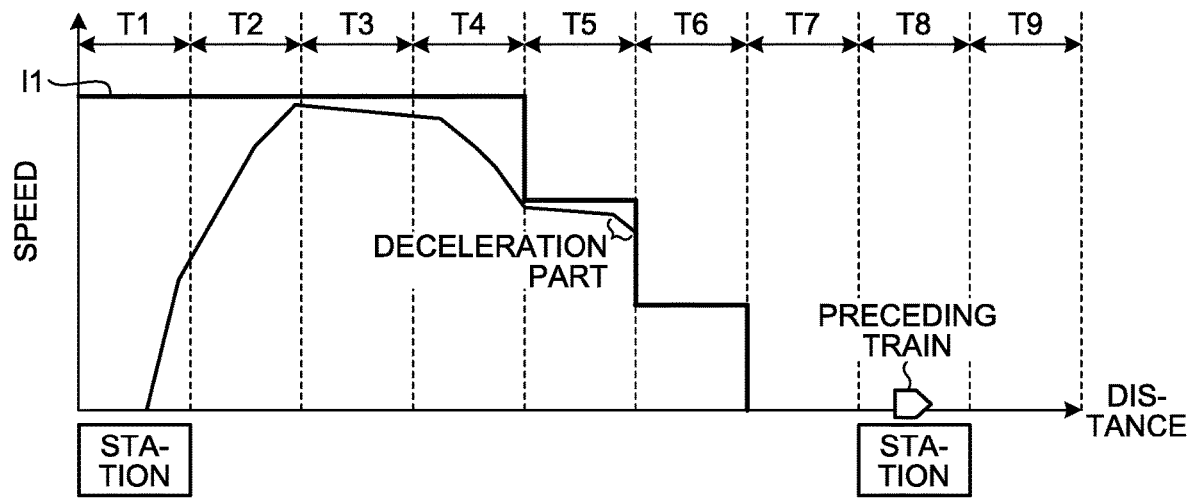
FIG. 13 is a diagram for explaining an example of the procedure for the train control device to create the travel plan, according to the embodiment.
Figure 14:
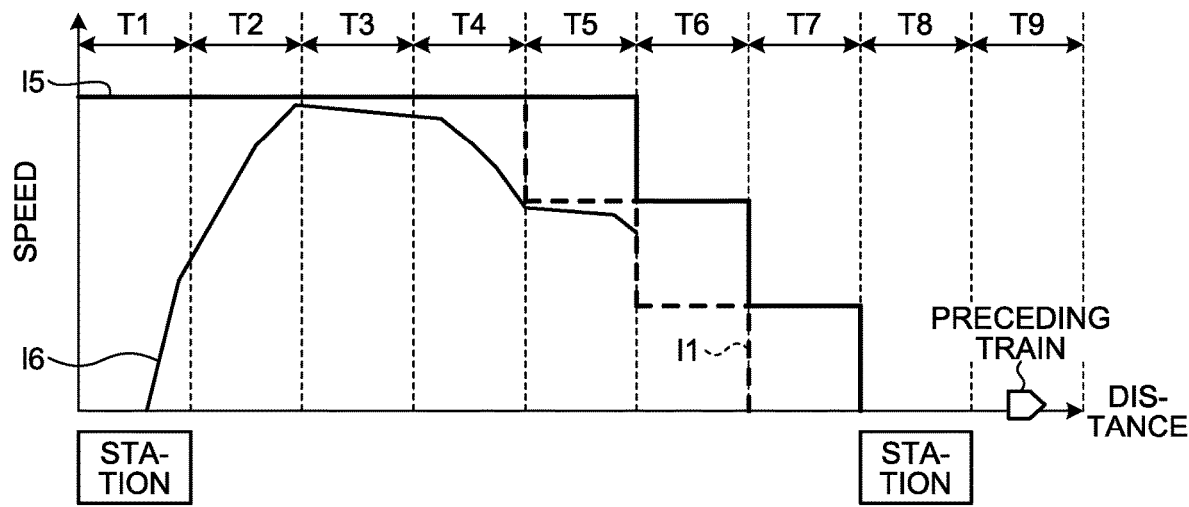
FIG. 14 is a diagram for explaining an example of the procedure for the train control device to create the travel plan, according to the embodiment.
Figure 15:
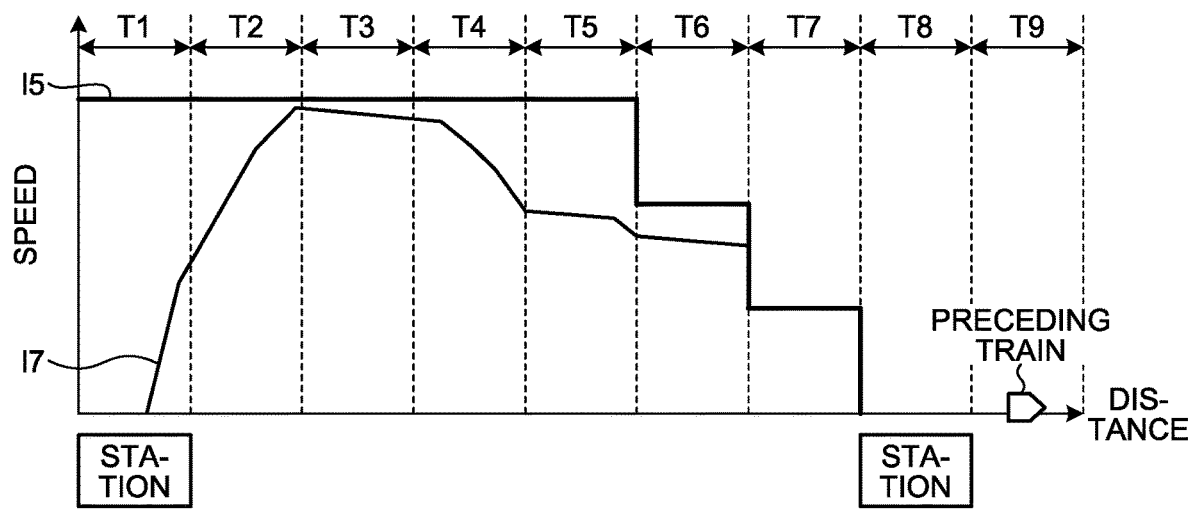
FIG. 15 is a diagram for explaining an example of the procedure for the train control device to create the travel plan, according to the embodiment.
Figure 16:
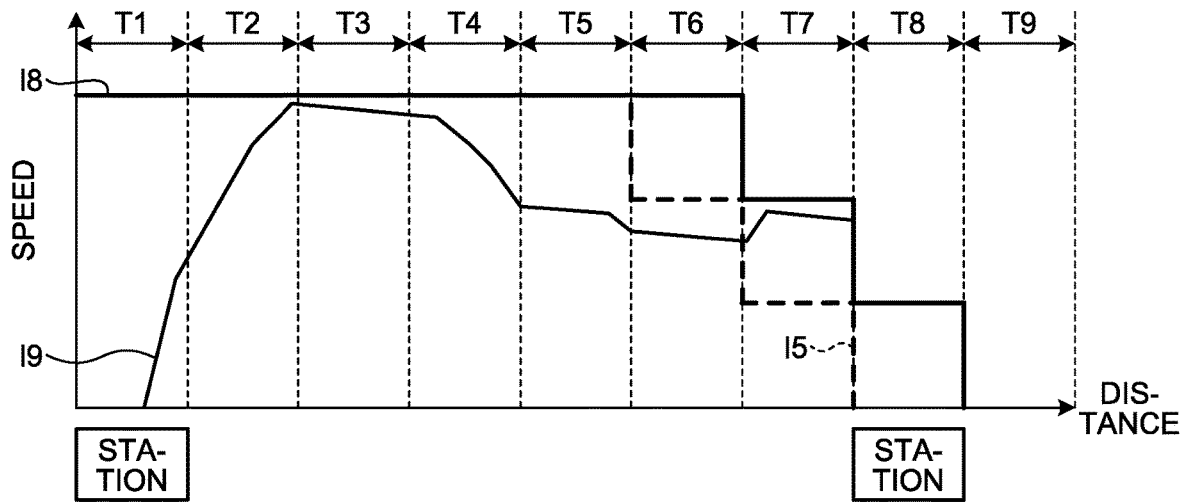
FIG. 16 is a diagram for explaining an example of the procedure for the train control device to create the travel plan, according to the embodiment.
Figure 17:
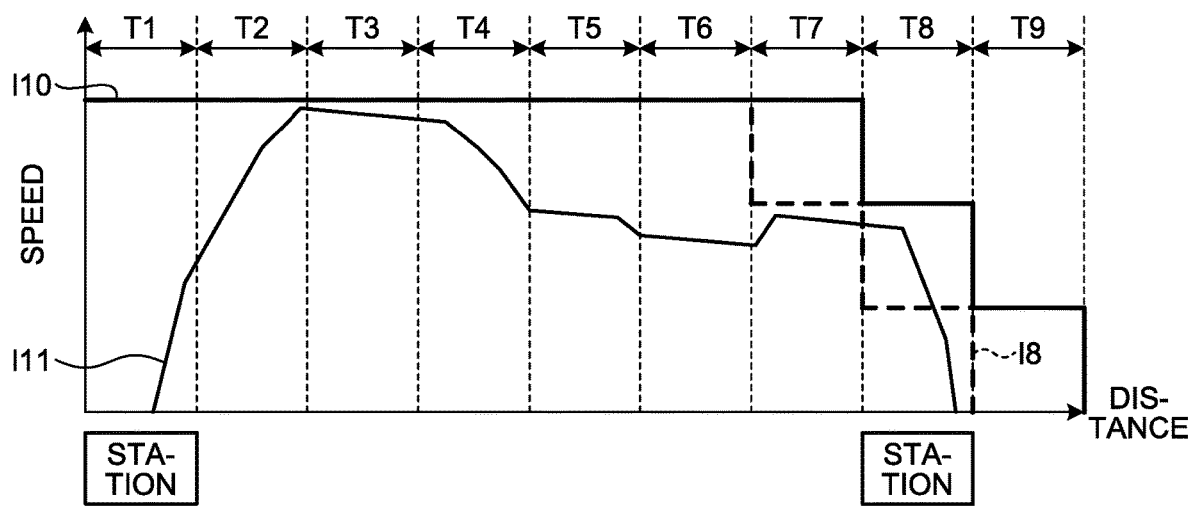
FIG. 17 is a diagram for explaining an example of the procedure for the train control device to create the travel plan, according to the embodiment.
Figure 18:
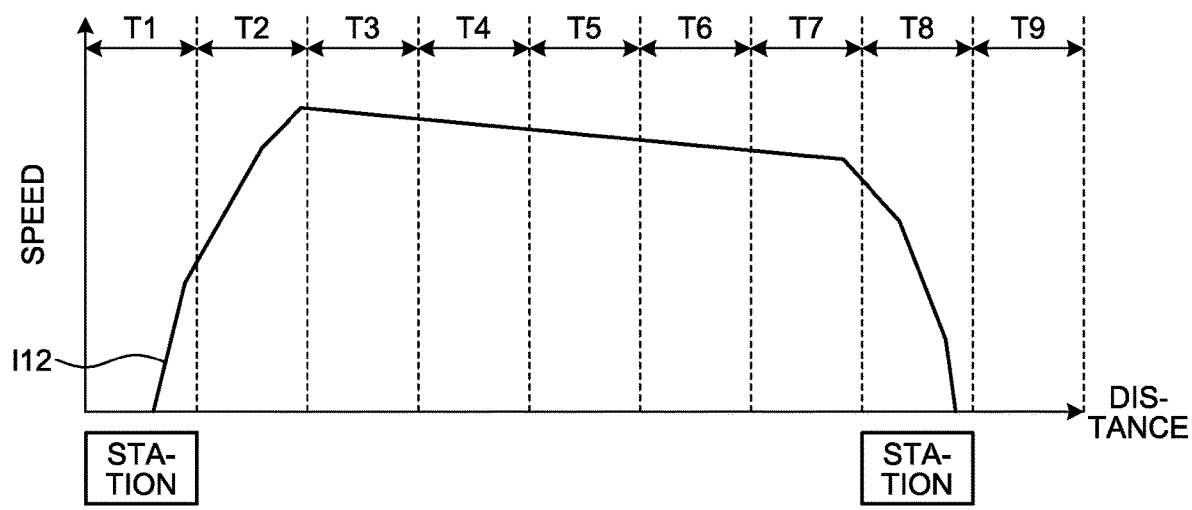
FIG. 18 is a diagram for explaining an example of the procedure for the train control device to create the travel plan, according to the embodiment.

Here, it is assumed that the position of the preceding train is changed from the block T8 to the block T9 at the timing τ3 when the train enters the block T6 according to the travel plan illustrated in FIG. 13 so that the limit speed in each block T is changed from the limit speed illustrated in polygonal line 11 of FIG. 13 to the limit speed illustrated in polygonal line 15 of FIG. 14. In this case, the speed of the train at the time of entering the block T6 becomes slower than the limit speed in the block T6, as illustrated in FIG. 14, whereby the ATO device 33 stops the replacement illustrated in FIG. 13 (i.e., the replacement of the coasting-running part with the deceleration part).

The ATO device 33 then adds, in accordance with the procedure similar to those described above (see FIGS. 11 to 13), the travel plan (see polygonal line 16 of FIG. 14) on or before the block T5, which has been created so far, to the travel plan for traveling the succeeding block T6 at the speed equal to or slower than the limit speed and as fast as possible, so that a travel plan (see a straight line 17 of FIG. 15) before the block T6 is created. Meanwhile, the timing when the limit speed in each block T is changed is calculated based on the schedule information as illustrated in FIG. 2 described above.

The ATO device 33 also creates the travel plan in the remaining blocks T7 and T8 to a next station in accordance with the procedure similar to that described above. A polygonal line 18 of FIG. 16 indicates the limit speed in each block T which is changed in accordance with the further movement of the preceding train from the position of FIG. 15; and a polygonal line 19 of FIG. 16 indicates the travel plan on or before block T7. A polygonal line 110 of FIG. 17 indicates the limit speed in each block T which is changed in accordance with the further movement of the preceding train from the position of FIG. 16; and a polygonal line 111 of FIG. 17 indicates the travel plan on or before the block T8. According to the procedure described above, the travel plan from when the train departs from a station located at the block T1 to when the train stops at a station located at the block T8 is created.

Meanwhile, if no preceding train is present, there is a case where the train is not influenced by the limit speed due to the presence of the preceding train during a period from the departure from the station located on the block T1 to the stop at the station located on the block T8. In this case, since it is not necessary to consider at what timing the limit speed due to the presence of the preceding train is changed, the ATO device 33 creates a travel plan (see a polygonal line 112 of FIG. 18) for traveling from the block T1 to the block T8 in time according to an operation plan based on the maximum value of the limit speed registered in the signal expansion information (see FIG. 3) read from the storage unit 35 without using the schedule information illustrated in FIG. 2.

In addition, when the travel plan is created as described above, the ATO device 33 according to the embodiment is configured to calculate the schedule information (the information indicating each hour at which the train is scheduled to exit each block T on the track) of its own train based on the created travel plan and the current time clocked by the timer unit 34. Furthermore, the ATO device 33 is configured to send the calculated schedule information of its own train to a following train via the communication device 10.

Next, an example of the process which is executed when the train control device 30 creates the travel plan will be described with reference to FIG. 19, according to the embodiment.

Figure 19:
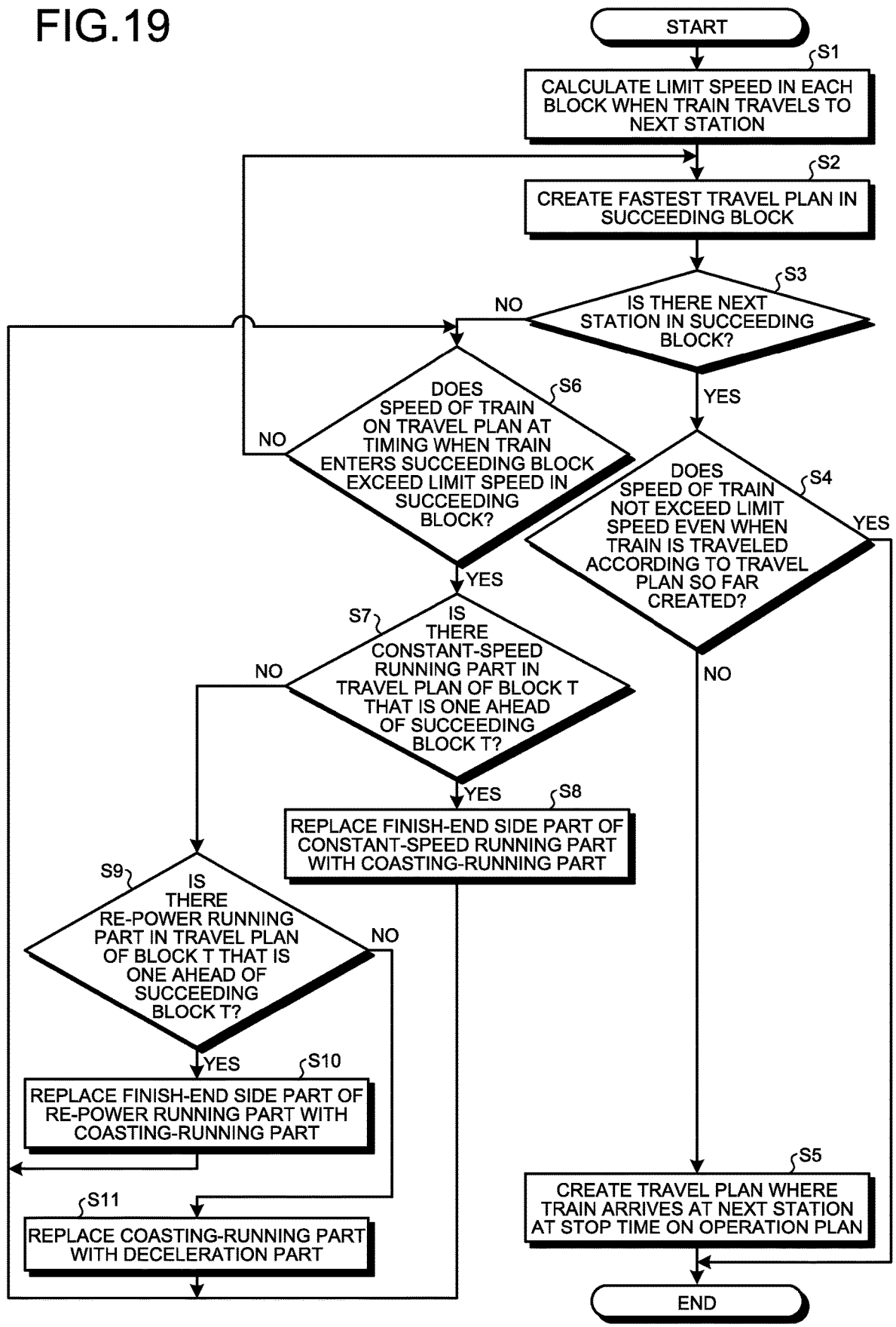
FIG. 19 is a flowchart illustrating an example of processes which are executed when the train control device creates the travel plan, according to the embodiment.

In the embodiment, at step S1, the ATO device 33 calculates the limit speed in each block T when the train travels to the next station, as illustrated in FIG. 19. More specifically, the ATO device 33 calculates the limit speed in each block T at each scheduled hour when the preceding train is scheduled to exit each block T on the basis of: the schedule information received by the communication device 10; the information indicating the speed and position of the train detected by the speed/position detection unit 31; the signal expansion information stored in the storage unit 35; the signal indication information received by the ATC in-vehicle device 32; and the current time clocked by the timer unit 34. Then, the process proceeds to step S2.

Next, at step S2, the ATO device 33 creates the fastest travel plan of a succeeding block T based on the limit speed calculated at step S1. Then, the process proceeds to step S3.

Next, at step S3, the ATO device 33 determines whether or not there is a next station in the succeeding block T.

At step S3, if it is determined that there is a next station in the succeeding block T, the process proceeds to step S4. Then, at step S4, the ATO device 33 determines whether or not the speed of the train exceeds the limit speed in each block T even when the train travels according to the travel plan so far created.

At step S4, if it is determined that the speed of the train does not exceed the limit speed, the process proceeds to step S5. Then, at step S5, the ATO device 33 creates the travel plan where the train arrives at the next station at the stop time on the operation plan, on the basis of the fastest travel plan created at step S2. Then, the process is finished.

At step S4, if it is determined that the speed of the train exceeds the limit speed, that is, if the speed of the train exceeds the limit speed in a block T when the train travels according to the travel plan so far created, the process is finished as it is without creating the travel plan to the next station.

At step S3, if it is determined that there is no next station in the succeeding block T, the process proceeds to step S6. Then, at step S6, the ATO device 33 determines whether or not the speed of the train on the travel plan at the timing when the train enters the succeeding block T exceeds the limit speed in the succeeding block T at the timing.

At step S6, if the speed of the train does not exceed the limit speed, that is, if it is determined that the speed of the train is equal to or slower than the limit speed, the process returns to step S2. In addition, at step S6, if it is determined that the speed of the train exceeds the limit speed, the process proceeds to step S7.

At step S7, the ATO device 33 determines whether or not the constant-speed running part indicating constant-speed-running traveling of the train is in the travel plan of the block T located on one ahead of the succeeding block T.

At step S7, if it is determined that there is a constant-speed running part, the process proceeds to step S8. Then, at step S8, the ATO device 33 modifies the travel plan so far created by replacing the finish-end side part of the constant-speed running part with the coasting-running part indicating coasting-running of the train. Then, the process returns to step S6.

On the contrary, at step S7, if it is determined that there is no constant-speed running part, the process proceeds to step S9. Then, at step S9, the ATO device 33 determines whether or not the re-power running part, which indicates that the train having been performed power running once or more performs power running again, is in the travel plan of the block T located on one ahead of the succeeding block T.

At step S9, if it is determined that there is the re-power running part, the process proceeds to step S10. Then, at step S10, the ATO device 33 modifies the travel plan so far created by replacing the finish-end side part of the re-power running part with the coasting-running part. Then, the process returns to step S6.

At step S9, if it is determined that there is no re-power running part, the process proceeds to step S11. In this case, since only either the coasting-running part or the deceleration part indicating that the train is decelerated is in the travel plan of the block T located on one ahead of the succeeding block T, the ATO device 33 modifies the travel plan so far created by replacing the finish-end side part of the coasting-running part with the deceleration part at step S11. Then the process returns to the step S6.

As described above, the storage unit 35 of the embodiment stores therein the signal expansion information (see FIG. 3) for calculating the limit speed of the train in each block T at each schedule hour when the preceding train exits each block T. The ATO device 33 of the embodiment is configured: to acquire the schedule information (see FIG. 2) indicating each schedule hour described above from the preceding train via the communication device 10; to calculate the limit speed of the train in each block T at the schedule hour based on the schedule information and the signal expansion information; to create the travel plan, in which the speed of the train is prevented from exceeding the limit speed at each timing when the train enters each block T until the train arrives at the next station and in which the train travels each block T as fast as possible until the train arrives at the next station, based on the limit speed; and to control the train according to the travel plan. Therefore, since the train can travel to the next station as fast as possible while the speed of the train is prevented from exceeding the limit speed at each timing when the train enters each block T until the train arrives at the next station, the train can smoothly travel while the influence on the following train is minimized.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:
1. A train control device comprising:
a storage unit that stores therein first information for calculating a limit speed of a train in each of blocks for each of schedule hours at which a preceding train exits the each of the blocks; and
a control unit that is configured to:
acquire second information indicating each of the schedule hours from the preceding train;
calculate the limit speed of the train based on the first information and the second information;
create a travel plan, in which a speed of the train is prevented from exceeding the limit speed at each timing at which the train enters a respective one of the blocks until the train arrives at a next station and in which the train travels each of the blocks as fast as possible until the train arrives at the next station, based on the limit speed; and
control the train according to the travel plan,
wherein the control unit is configured to create the travel plan by repeating processes for each of the blocks to the next station, the processes including:
a process of creating a fastest travel plan for making the train travel a first block among the blocks as fast as possible;
a process of, when the limit speed of the train in a second block succeeding the first block is changed from a first speed to a second speed at a first timing at which the train enters the second block, modifying the fastest travel plan such that the speed of the train becomes equal to or slower than the second speed at the first timing; and
a process of, when the limit speed of the train in the second block maintains the first speed at the first timing without changing to the second speed, modifying the fastest travel plan such that the speed of the train becomes equal to or slower than the first speed at the first timing.

2. The train control device according to claim 1, wherein when the speed of the train at the first timing is higher than the limit speed in the second block at the first timing, the control unit modifies the fastest travel plan by replacing at least a part of a constant-speed running part or a re-power running part with a coasting part, the constant-speed running part being a part in which the train travels at a constant-speed, the re-power running part being part in which the train which has been performed power-running once performs the power-running again, and the coasting part being a part in which the train coasts, the constant-speed running part and the re-power running part being included in the travel plan of the first block.

3. The train control device according to claim 2, wherein when the speed of the train at the first timing is higher than the limit speed in the second block at the first timing even when the at least the part of the constant-speed running part or the re-power running part is replaced with the coasting part, the control unit further modifies the fastest travel plan by replacing at least a part of the coasting part with a deceleration part being a part in which the train decelerates.

* * * * *